US010324479B2

(12) United States Patent
Yoon

(10) Patent No.: US 10,324,479 B2
(45) Date of Patent: Jun. 18, 2019

(54) PORTABLE PLANT INSTRUMENT FREEZING AND BURSTING PREVENTION DEVICE USING NON-DIRECTIONAL SERIAL CONNECTOR

(71) Applicant: KEPCO ENGINEERING & CONSTRUCTION COMPANY, INC., Gimcheon-si, Gyeongsangbuk-do (KR)

(72) Inventor: Chang Sun Yoon, Gwangmyeong-si (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 129 days.

(21) Appl. No.: 15/699,089

(22) Filed: Sep. 8, 2017

(65) Prior Publication Data
US 2018/0113483 A1 Apr. 26, 2018

(51) Int. Cl.
*E03B 7/10* (2006.01)
*E03B 7/12* (2006.01)
(Continued)

(52) U.S. Cl.
CPC .............. *G05D 23/24* (2013.01); *F24D 13/02* (2013.01); *E03B 7/10* (2013.01); *E03B 7/12* (2013.01);
(Continued)

(58) Field of Classification Search
CPC ......... G05D 23/24; F24D 13/02; F16L 53/38; E03B 7/10; E03B 7/12
(Continued)

(56) References Cited

U.S. PATENT DOCUMENTS 2,745,942 A * 5/1956 Cohen ...................... H05B 3/00
219/528
3,259,732 A * 7/1966 Jepson ...................... H05B 3/06
174/77 R
(Continued)

FOREIGN PATENT DOCUMENTS

JP 2923642 B1 * 7/1999
JP 11-229452 A 8/1999
(Continued)

OTHER PUBLICATIONS

Translation of JP 2923642 B1 entitled Translation—JP 2923642 B1 (Year: 2019).*
(Continued)

*Primary Examiner* — Paul Alvare
(74) *Attorney, Agent, or Firm* — Nixon Peabody LLP; Jeffrey L. Costellia

(57) ABSTRACT

A portable plant instrument freezing and bursting prevention device using a non-directional serial connector includes a main body portion, a plurality of heat wire portions, each of the plurality of heat wire portions comprising a male connector having a cylindrical shape, a heat wire having resistance, and a female connector having a cylindrical shape and having a hollow portion with both ends open, which are sequentially coupled to one another, and an end cap inserted into the female connector at an end of the plurality of heat wire portions to short-circuit the female connector, in which the male connector of one of the plurality of heat wire portions is inserted into the female connector of another one of the plurality of heat wire portions, and thus the plurality of heat wire portions are serially connected to one another.

9 Claims, 3 Drawing Sheets

(51) Int. Cl.
*F24D 13/02* (2006.01)
*F16L 53/38* (2018.01)
*G05D 23/24* (2006.01)
*H01R 31/08* (2006.01)
*H01R 13/703* (2006.01)

(52) U.S. Cl.
CPC ........... *F16L 53/38* (2018.01); *H01R 13/7031* (2013.01); *H01R 31/08* (2013.01); *Y02B 30/26* (2013.01)

(58) Field of Classification Search
USPC ...................................... 165/104.23; 439/224
See application file for complete search history.

(56) References Cited

U.S. PATENT DOCUMENTS

| | | | | |
|---|---|---|---|---|
| 3,344,392 A * | 9/1967 | Briscoe | ................ | H01R 13/506 174/117 FF |
| 3,384,859 A * | 5/1968 | Loose | .................... | H01R 24/38 439/436 |
| 4,069,410 A * | 1/1978 | Keep, Jr. | ................. | H05B 3/56 174/109 |
| 4,100,398 A * | 7/1978 | Levin | ..................... | B32B 17/10 174/267 |
| 4,214,147 A * | 7/1980 | Kraver | ................. | F28F 19/006 392/468 |
| 4,728,780 A * | 3/1988 | Uchino | ................... | F24D 13/02 219/448.11 |
| 8,559,800 B2 * | 10/2013 | Ellis | ........................ | F16L 53/37 392/468 |
| 2005/0063689 A1 * | 3/2005 | Auber | ................... | F01N 3/2066 392/468 |
| 2007/0243423 A1 * | 10/2007 | Ho | ........................ | H01M 2/105 429/1 |
| 2011/0274418 A1 * | 11/2011 | Meisiek | ................. | F16L 53/38 392/480 |
| 2012/0091115 A1 * | 4/2012 | Mironichev | .......... | H02J 7/0014 219/211 |
| 2017/0303695 A1 * | 10/2017 | Xia | ...................... | A47C 21/048 |

FOREIGN PATENT DOCUMENTS

| | | |
|---|---|---|
| JP | 2002-276951 A | 9/2002 |
| KR | 1995-0000323 Y1 | 1/1995 |
| KR | 20-0297077 Y1 | 12/2002 |
| KR | 2015-0046519 A | 4/2015 |

OTHER PUBLICATIONS

Korean Office Action, dated Sep. 13, 2017, issued in Korean Patent Application No. 2016-0139290, 7 pages.

* cited by examiner

PORTABLE PLANT INSTRUMENT FREEZING AND BURSTING PREVENTION DEVICE USING NON-DIRECTIONAL SERIAL CONNECTOR

CROSS-REFERENCE TO RELATED APPLICATION

This application claims the benefit of Korean Patent Application No. 10-2016-0139290, filed on Oct. 25, 2016, in the Korean Intellectual Property Office, the disclosure of which is incorporated herein in its entirety by reference.

BACKGROUND

1. Field

One or more embodiments relate to a portable plant instrument freezing and bursting prevention device using a non-directional serial connector, and more particularly, to a portable plant instrument freezing and bursting prevention device which may prevent freezing and bursting of a plant instrument by connecting and extending heat wires using male/female connectors in various situations in which electric power is not supplied.

2. Description of the Related Art

Among instruments used for a plant, an instrument using an impulse pipe, for example, a pressure gauge, a flow meter, a differential pressure gauge, etc., and a sight flow gauge that directly contact a fluid, may be frozen to burst when a surrounding temperature descends below zero. Even at actual sites, damage due to freezing and bursting by cold waves has been frequently reported.

In general, the possibility of freezing and bursting is not high because all freezing and bursting prevention equipment is properly operated after a commercial operation of a plant is initiated. However, since the construction of a plant needs at least two years, a construction or test run in the winter season is unavoidable when the plant is constructed in a country having the winter period. During a period when freezing and bursting is expected, commercialized freezing and bursting prevention heat wires or electric heaters are installed. In this case, a separate electric power source is necessary.

However, a separate electric power source for the freezing and bursting prevention equipment is not provided in many cases. Even when the electric power source is provided, a long extended line to draw electric power to a location needing prevention of freezing and bursting is needed. Furthermore, since the length of a commercialized temporary freezing and bursting prevention heat wire is limited, it is difficult to use the heat wire for instruments to which impulse pipes are connected long. While the importance of freezing and bursting prevention at a construction site is recognized, due to these inconveniences, freezing and bursting damage unavoidably occurs when a sudden cold wave occurs because appropriate freezing and bursting prevention equipment is not installed in a timely manner.

SUMMARY

One or more embodiments include a portable plant instrument freezing and bursting prevention device using a non-directional serial connector, in which heat wires are connected and extended by using male/female connectors. Thus, freezing and bursting of a plant instrument in various situations in which electric power is not supplied may be prevented.

Additional aspects will be set forth in part in the description which follows and, in part, will be apparent from the description, or may be learned by practice of the presented embodiments.

According to one or more embodiments, a portable plant instrument freezing and bursting prevention device using a non-directional serial connector includes a main body portion, a plurality of heat wire portions, each of the plurality of heat wire portions comprising a male connector having a cylindrical shape, a heat wire having resistance, and a female connector having a cylindrical shape and having a hollow portion with both ends open, which are sequentially coupled to one another, and an end cap inserted into the female connector at an end of the plurality of heat wire portions to short-circuit the female connector, in which the male connector of one of the plurality of heat wire portions is inserted into the female connector of another one of the plurality of heat wire portions, and thus the plurality of heat wire portions are serially connected to one another.

The main body portion may include a power supply for supplying electric power, a lithium battery charged by the power supply, a variable resistance unit connected to the lithium battery and controlling current flowing in the heat wire portion, and an auxiliary arm connector connected to the variable resistant unit, in which the male connector of an end of the plurality of heat wire portions is inserted into the auxiliary arm connector.

The variable resistance unit may include a current control switch and a current meter.

The main body portion may further include a changeover switch connecting the power supply to the variable resistance unit.

The main body portion may further include a fuse disposed between the variable resistance unit and the auxiliary arm connector.

The main body portion may further include a heat wire portion storing unit.

The main body portion may further include a temperature gauge.

A first ring and a second ring of a conductive body may be coupled along an outer circumferential surface of the male connector at opposite end portions of the male connector, and a third ring and a fourth ring of a conductive body may be coupled along an inner circumferential surface of the hollow portion of the female connector at an opposite end portion of the female connector.

The heat wire may include a first heat wire and a second heat wire, and the first heat wire may connect the first ring to the third ring and the second heat wire may connect the second ring to the fourth ring.

An opening may be formed in each of the third ring and fourth ring along the lengthwise direction.

The main body portion may include a multi-tap having one end portion that is the male connector and the other end portion that is a plurality of female connectors connected to the heat wire in parallel, and the male connector may be coupled to the auxiliary arm connector.

An interval between the first ring and the second ring may be longer than a length of each of the first ring and the second ring in a lengthwise direction.

An interval between the third ring and the fourth ring may be longer than a length of each of the third ring and the fourth ring in a lengthwise direction.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
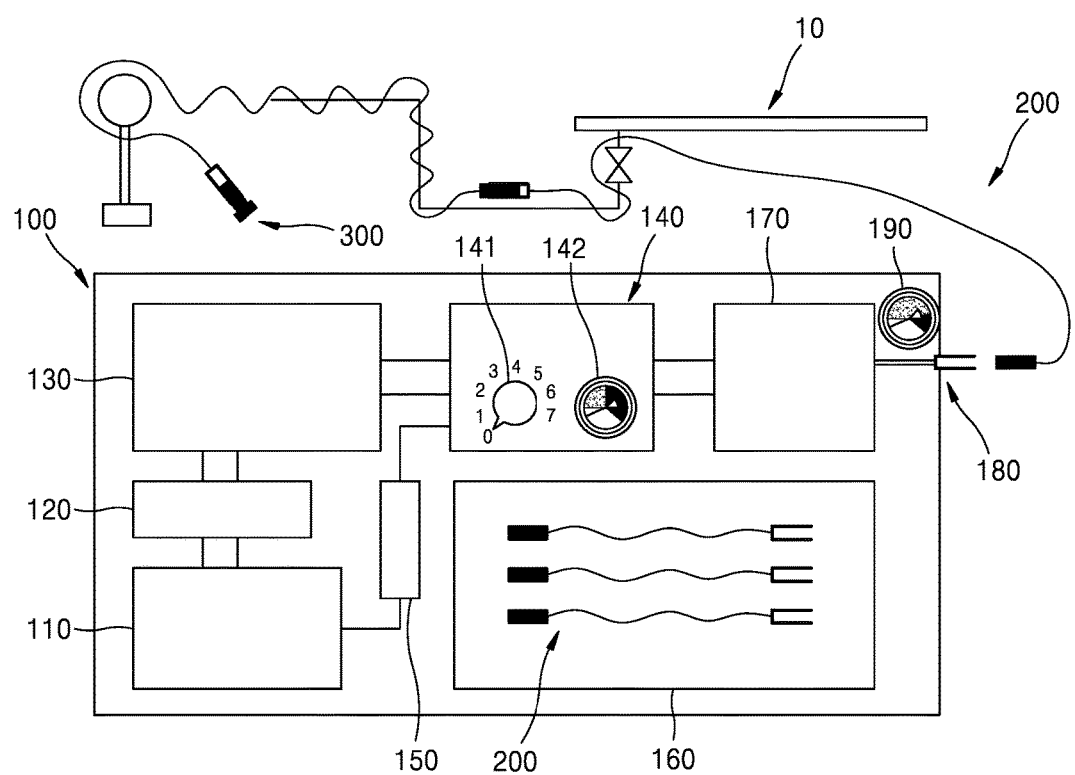
FIG. 1 illustrates a freezing and bursting prevention device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an overall configuration of a freezing and bursting prevention device according to an embodiment. Each of the constituent elements forming the portable plant instrument freezing and bursting prevention device is described with reference to FIG. 1.

The plant instrument freezing and bursting prevention device according to the present embodiment may include a main body portion 100, a heat wire portion 200, and an end cap 300. The main body portion 100 may include a power supply 110, a charging module 120, a lithium battery 130, a variable resistance unit 140, a changeover switch 150, a heat wire portion storing unit 160, a fuse 170, an auxiliary arm connector 180, and a temperature gauge 190.

The power supply 110 receives electric power from the outside and supplies the received electric power to the inside of the main body portion 100. The power supply 110 is sequentially connected to the charging module 120 and the lithium battery 130. The electric power supplied from the power supply 110 is used to charge the lithium battery 130 via the charging module 120. Accordingly, when the lithium battery 130 initially receives the electric power through the power supply 110, additional power supply to the main body portion 100 is unnecessary until the battery life is reached, thereby enabling carrying the plant instrument freezing and bursting prevention device. Due to the portability, unlike an existing freezing and bursting prevention device, it is advantageous that no separate power supply for freezing and bursting prevention equipment is necessary.

The lithium battery 130 is connected to the variable resistance unit 140. The changeover switch 150 connecting the power supply 110 to the variable resistance unit 140 may be provided. There is no need to separately charge the lithium battery 130 in an area where electric power is supplied. Accordingly, the changeover switch 150 performs switching to have the main body portion 100 operated by the external electric power without charging the lithium battery 130 in the area where the electric power is supplied, and to have the main body portion 100 operated by the lithium battery 130 in an area where no electric power is supplied.

The variable resistance unit 140 is connected to the lithium battery 130. The variable resistance unit 140 includes a variable resistor. The variable resistor is a resistor having a resistance value that may be freely changed in a circuit. The amount of current may be controlled by changing the total resistance of the circuit by using the variable resistor. An appropriate amount of current is supplied to the heat wire portion 200. When an excessive amount of current flows in the heat wire portion 200, there may be a fire in the freezing and bursting prevention device. When an amount of current less than a reference amount flows in the heat wire portion 200, a heating function for the freezing and bursting prevention may not be appropriately performed. Accordingly, the variable resistance unit 140 may control the amount of current flowing in the heat wire portion 200. The variable resistance unit 140 may further include a current control switch 141 and a current meter 142. The current control switch 141 may control the amount of variable resistance. The current meter 142 is a device that enables a user to see the amount of current that flows in the heat wire portion 200 during the operation. Accordingly, the above devices may improve convenience of user operation.

The variable resistance unit 140 is connected to the fuse 170. The fuse 170 according to the present embodiment prevents further supply of current to the heat wire portion 200 by being blown when an excessive amount of current flows in the heat wire portion 200. Accordingly, the device and the heat wire may be protected, and thus a fire may be prevented and safety may be improved.

The variable resistance unit 140 is connected to the auxiliary arm connector 180. The auxiliary arm connector 180 is a part to which the heat wire portion 200 is first coupled, and has the same shape as a female connector 220 of the heat wire portion 200. As it is described below, a male connector 210 at an end portion of each of a plurality of heat wire portions provided as the heat wire portion 200 is inserted in and coupled to the auxiliary arm connector 180, thereby connecting the main body portion 100 to the heat wire portion 200.

The temperature gauge 190 may be provided around the auxiliary arm connector 180. Since the heat wire portion 200 is connected in series from a circuit perspective, as described below, heat generated at a point in a closed circuit may be the same as heat radiated from a certain point in a heat wire 230. Accordingly, as the temperature gauge 190 is provided at the auxiliary arm connector 180, the temperature of the heat wire portion 200 of the freezing and bursting prevention device according to the present embodiment may be frequently checked through the temperature gauge 190, and thus safety and convenience may be improved.

The heat wire portion storing unit 160 may be provided at a position in the main body portion 100. The heat wire portion storing unit 160 is a device to store a plurality of heat wire portions as the heat wire portion 200, that is, the heat wire portion 200 may be stored in advance to extend the heat wire portion 200 according to the length of the heat wire portion 200 needed at a site.

Figure 2:
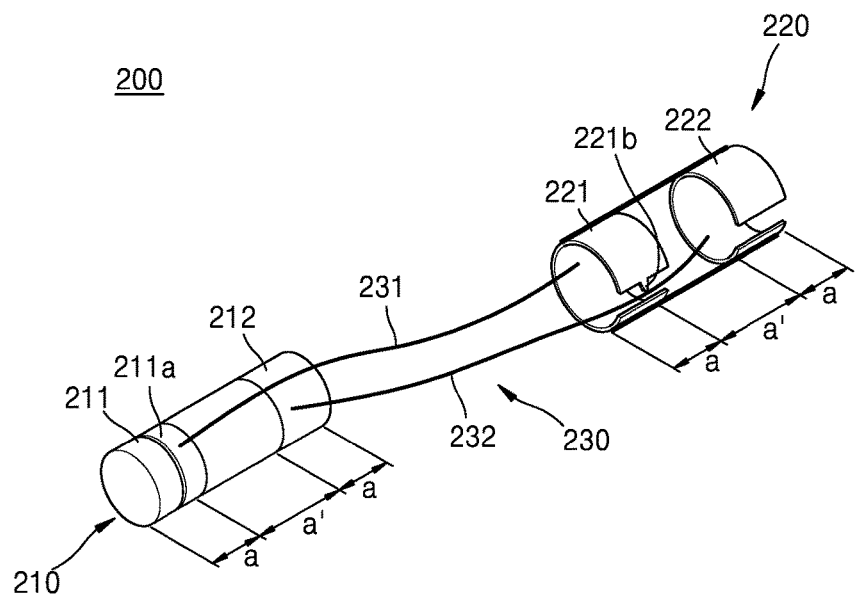
FIG. 2 illustrates a heat wire portion according to an embodiment.

The main body portion 100 may be connected to the heat wire portion 200 at a point of the auxiliary arm connector 180. FIG. 2 illustrates constituent elements of the heat wire portion 200. The heat wire portion 200 is described below with reference to FIG. 2.

The heat wire portion 200 may include the male connector 210, the female connector 220, and the heat wire 230. Although both of the male connector 210 and the female connector 220 have a cylindrical shape, the present disclosure is not limited thereto. The female connector 220 may have a cylindrical shape having a hollow portion with both ends open, to insert the male connector 210 therein. Accordingly, an inner diameter of the hollow portion may be larger than an inner diameter of the male connector 210.

A first ring 211 and a second ring 212 are coupled to the male connector 210, and a third ring 221 and a fourth ring 222 are coupled to the female connector 220. The first ring 211 to the fourth ring 222 are metal conductive bodies. The first ring 211 and the second ring 212 may be coupled to opposite ends portions of the male connector 210 along the outer circumferential surface thereof, and the first ring 211 and the second ring 212 are arranged spaced apart in a lengthwise direction by a certain interval. The third ring 221 and the fourth ring 222 may be provided along an inner circumferential surface at the opposite end portions of the hollow portion of the female connector 220, and may be arranged spaced apart from each other in the lengthwise direction by a certain interval. Furthermore, FIG. 2 illustrates the inside of the female connector 220 to show a coupling state of the third ring 221 and the fourth ring 222.

The third ring 221 and the fourth ring 222 may have an opening in a circumferential direction by a certain distance along the lengthwise direction. In other words, the third ring 221 and the fourth ring 222 have a C shape when viewed in a side direction. due to the above shape, when the male connector 210 is inserted into the female connector 220, due to elasticity of the metal conductive body and the opening structure, the third ring 221 and the fourth ring 222 have a structure of gripping the male connector 210, thereby facilitating coupling and separating.

Furthermore, a protrusion 221b is formed on the third ring 221, and a guideline 211a is formed in a circumferential direction at a position of the first ring 211 corresponding to the protrusion 221b when the male connector 210 is inserted into the female connector 220. A snap sound is generated when the protrusion 221b is inserted in the guideline 211a and connected thereto, thereby notifying a normal connection state between the two connectors.

An interval a' between the first ring 211 and the second ring 212 may be longer than a length a of each of the first ring 211 and the second ring 212 in the lengthwise direction. Furthermore, likewise, in the third ring 221 and the fourth ring 222, an interval a' between the third ring 221 and the fourth ring 222 may be longer than a length a of each of the third ring 221 and the fourth ring 222 in the lengthwise direction. This is to prevent short-circuit in a process in which the male connector 210 is inserted into the female connector 220.

A commercialized nickel-chrome or similar based heat wire is used as the heat wire 230, and thus, when a certain amount of current flows, heat proportional to the current is generated. As current flows, heat is generated. The heat may prevent freezing and bursting of a plant instrument.

Furthermore, the heat wire 230 may include a first heat wire 231 and a second heat wire 232 forming a pair. The first heat wire 231 and the second heat wire 232 have resistance. In the present embodiment, resistance of an amount of R/2 per heat wire 231 or 232 is assumed for convenience of explanation. The first heat wire 231 connects the first ring 211 and the third ring 221, and the second heat wire 232 connects the second ring 212 and the fourth ring 222. When a plurality of heat wire portions are formed as the heat wire portion 200 due to the above structure, current flows in the whole of the heat wire portion 200 and thus heat is generated due to resistance.

Furthermore, the structure of the heat wire portion 200 according to the present embodiment in which a plurality of rings of a metal material are present, unlike the existing connector structure, heat is generated from the male connector 210 and the female connector 220. Due to the above structure, efficiency of freezing and bursting prevention may be improved.

Figure 3:
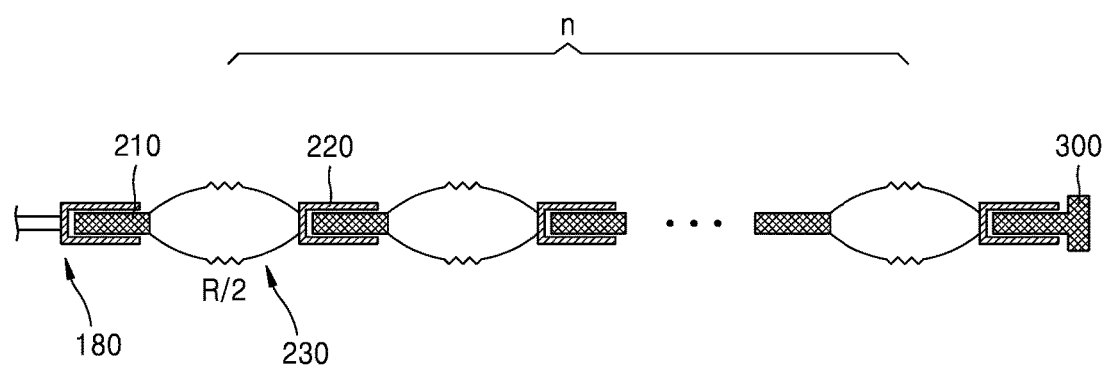
FIG. 3 illustrates coupling of a plurality of heat wire portions according to an embodiment.

FIG. 3 illustrates a structure of coupling a plurality of heat wire portions 200 according to an embodiment. The structure of coupling the heat wire portions 200 is described below with reference to FIG. 3.

The male connector 210 of one of the heat wire portions 200 is inserted in and coupled to the female connector 220 of another heat wire portion 200. Although the male connector 210 is inserted into the hollow portion of the female connector 220, in FIGS. 1, 3, and 4, to emphasize the shape of insertion, for convenience of explanation, the shape of the female connector 220 is illustrated as having a "⊏" shape. As such, the heat wire portions 200 are formed in a shape of each of the male connector 210 and the female connector 220 biting a tail thereof. When an n-number (plural number) of the heat wire portions 200 are coupled to one another, a closed circuit is formed, and thus the overall resistance of the heat wire portion 200 is a serial connection and becomes "nR".

The heat wire portions 200 encompass a plant instrument 10 to prevent freezing and bursting (see FIG. 1). The freezing and bursting may be efficiently prevented by coupling the heat wire portions 200 as long as a desired length according to the size of the plant instrument 10. In other words, economical efficiency may be improved. Furthermore, regardless of the up, down, left, and right directions of the male connector 210 and the female connector 220, that is, non-directionally, the connectors may be connected and extended with only the insertion of as the male connector 210 and the female connector 220. Thus, there is no limit in the direction. Furthermore, since a possibility of a short-circuit failure or incorrect contact due to a connector direction error is reduced much, user inconvenience when the plant instrument freezing and bursting prevention device according to the present embodiment is applied to an actual site may be reduced.

An end portion of opposite ends of the heat wire portions 200 becomes the male connector 210, and the other end portion thereof becomes the female connector 220. The male connector 210 of one end portion is coupled to the auxiliary arm connector 180, and the end cap 300 is coupled to the other end portion of the female connector 220. The end cap 300 is manufactured to have the same size as the inner diameter of the male connector 210. The end cap 300 makes the overall heat wire portions 200 a closed circuit at the end of the heat wire 230. A conductive body is inserted in terminals, and the end cap 300 is coupled to the female connector 220, and then the female connector 220 is maintained in a short-circuit state, thereby forming a closed circuit.

Figure 4:
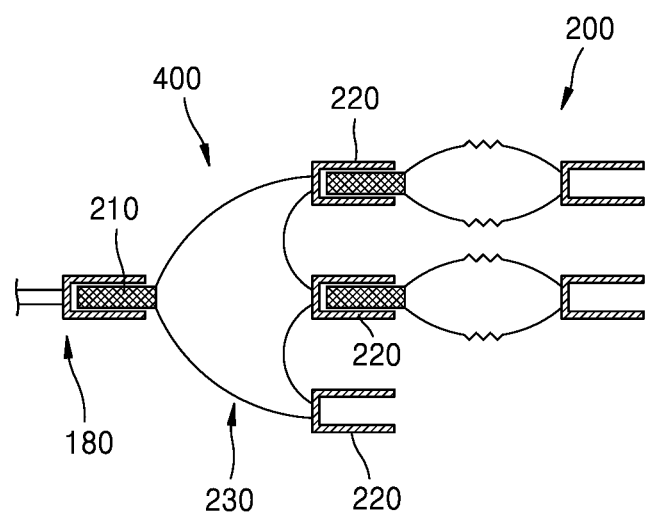
FIG. 4 illustrates a multi-tap according to an embodiment.

FIG. 4 illustrates a multi-tap 400 according to an embodiment. The multi-tap 400 is described below with reference to FIG. 4.

One end portion of the multi-tap 400 has a shape of the male connector 210, and the other end portions of the multi-tap 400 are connected in parallel, forming a plurality of female connectors as the female connector 220. Furthermore, the female connector 220 and the male connector 210 are all connected by the heat wire 230. The heat wire portion 200 may be coupled to each of the female connectors 220 connected in parallel to one another. Accordingly, since the heat wire portions 200 are coupled to one another in various directions, freezing and bursting of the plant instruments 10 may be prevented. Thus, economic efficiency and efficiency of the freezing and bursting prevention many be improved. In FIG. 4, as an example, one end portion of the multi-tap 400 is coupled to the auxiliary arm connector 180. However, one end portion of the multi-tap 400 may be coupled to the female connector 220, not to the auxiliary arm connector 180.

As described above, according to the above-described embodiment, no separate electric power source needs to be provided for the freezing and bursting prevention equipment.

Furthermore, current may be controlled through the variable resistance unit and user's operation convenience may be improved.

Furthermore, the fuse may protect the heat wire and prevent a fire.

Furthermore, the temperature of the heat wire is frequently checked by the temperature gauge, and thus safety and convenience may be improved.

Furthermore, due to elasticity of the metal conductive body and the opening structure, the third ring and the fourth ring have a structure of gripping the male connector, thereby facilitating coupling and separating.

Furthermore, since the protrusion is inserted in the guideline and connected thereto, a normal connection state between the two connectors may be notified.

Furthermore, since heat is generated from the male connector and the female connector, the efficiency of the freezing and bursting prevention may be improved.

Furthermore, since the heat wire portions are coupled as long as a desired length according to the size of the plant instrument, the freezing and bursting may be efficiently prevented.

Furthermore, since a possibility of a short-circuit or incorrect contact due to a connector direction error is reduced much, user inconvenience when the plant instrument freezing and bursting prevention device according to the above embodiment is applied to an actual site may be reduced.

Furthermore, since a plurality of heat wire portions are coupled in various directions through a multi-tap, a plurality of plant instruments may be prevented from being frozen and bursting, thereby improving efficiency.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A portable plant instrument freezing and bursting prevention device having a serial connector, the device comprising:
   a main body portion;
   a plurality of heat wire portions, each of the plurality of heat wire portions comprising a male connector having a cylindrical shape, a heat wire providing heat generated by resistance and a female connector having a cylindrical shape and having a hollow portion with both ends of the hollow portion open, which are sequentially coupled to one another; and
   an end cap inserted into one of the female connectors situated at an end of the plurality of heat wire portions to short-circuit the one of the female connectors,
   wherein the male connector of each one of the plurality of heat wire portions is inserted into the female connector of another one of the plurality of heat wire portions, and thus the plurality of heat wire portions are serially connected to one another, wherein
   a first ring and a second ring of a first conductive body are coupled along an outer circumferential surface of each of the male connectors at opposite end portions of each of the male connectors, and a third ring and a fourth ring of a second conductive body are coupled along an inner circumferential surface of the hollow portion of each of the female connectors at an opposite end portion of each of the female connectors,
   wherein the heat wire comprises a first heat wire and a second heat wire, and the first heat wire connects the first ring to the third ring and the second heat wire connects the second ring to the fourth ring.

2. The device of claim 1, wherein the main body portion comprises:
   a power supply for supplying electric power;
   a lithium battery charged by the power supply;
   a variable resistance unit connected to the lithium battery and controlling current flowing in the heat wire portion; and
   an auxiliary arm connector connected to the variable resistant unit,
   wherein the male connector of an end of the plurality of heat wire portions is inserted into the auxiliary arm connector.

3. The device of claim 2, wherein the variable resistance unit comprises a current control switch and a current meter.

4. The device of claim 2, wherein the main body portion further comprises a changeover switch connecting the power supply to the variable resistance unit.

5. The device of claim 2, wherein the main body portion further comprises a fuse disposed between the variable resistance unit and the auxiliary arm connector.

6. The device of claim 2, wherein the main body portion further comprises a heat wire portion storing unit.

7. The device of claim 2, wherein the main body portion further comprises a temperature gauge.

8. The device of claim 1, wherein an opening is formed in each of the third ring and fourth ring along the lengthwise direction.

9. The device of claim 2, wherein the main body portion comprises a multi-tap having one end portion that is a male connector and the other end portion that is a plurality of female connectors connected to the heat wire in parallel, and the male connector is coupled to the auxiliary arm connector.

* * * * *